UNITED STATES PATENT OFFICE.

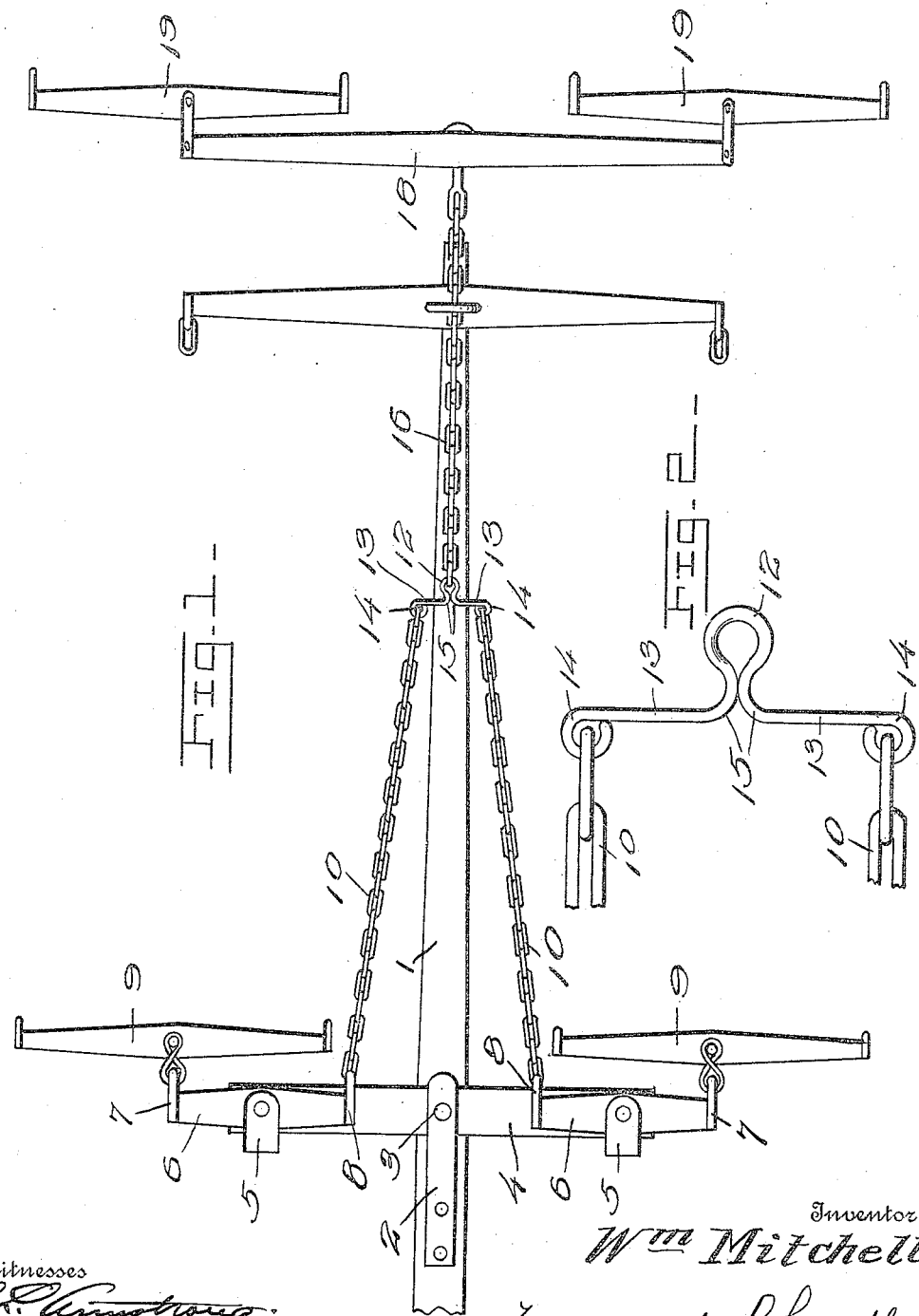

WILLIAM MITCHELL, OF FAIRMOUNT, NORTH DAKOTA.

FOUR-HORSE EQUALIZER.

962,234.  Specification of Letters Patent.  Patented June 21, 1910.

Application filed August 21, 1909. Serial No. 513,994.

*To all whom it may concern:*

Be it known that I, WILLIAM MITCHELL, a citizen of the United States, residing at Fairmount, in the county of Richland and State of North Dakota, have invented certain new and useful Improvements in Four-Horse Equalizers, of which the following is a specification.

This invention relates to certain new and useful improvements in four horse equalizers.

The primary object of my invention is to provide a four horse evener, of that type where two lead and two wheel horses are employed, the construction being such that the draft will be equally distributed.

Another object is to provide a four horse equalizer including a simply constructed resilient mechanism.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawing forming a portion of this specification, and in which like numerals of reference indicate similar parts in the several views, Figure 1 shows a top view of a four horse equalizer embodying my invention, Fig. 2 shows an enlarged detached top view of the resilient coupling as used in my invention.

In the accompanying drawings, the numeral 1 designates the tongue of a vehicle or farm implement to which the four horse equalizer is to be secured. This tongue is provided with the usual hammer strap 2 and the king bolt 3. This king bolt carries the pivotally held cross bar 4 which at its ends carries the clevises 5 in turn supporting the stub trees 6, two such stub trees being employed. At their outer ends these stub trees carry the clevises 7 while at their inner ends each stub tree is provided with a link 8 as is clearly disclosed in Fig. 1. Each clevis 7 supports a swingletree 9 of the usual construction, while extending from the links 8, are the chain sections 10, these chain sections being of equal length. In connection with these chain sections, I employ a resilient coupling or shackle comprising a spring metal bar bent to form the draw ing ear 12 from which ear extend in opposite directions the two similar arms 13 each arm ending in a terminal eye 14. The arms 13 have their inner ends curved as is shown at 15, these curved portions forming mutually adjacent cam faces for coengagement. Each chain section 10 is secured to one of the terminal eyes 14. These chain sections 10 are of a length less than the length of the tongue 1 and extending from the draw ear 12 is the drag chain 16 which extends a short distance beyond the front end of the tongue 1. This drag chain 16 is preferably carried through the neck yoke center as disclosed in Fig. 1. To the forward end of this drag chain 16 is secured an ordinary doubletree 18 carrying the usually constructed swingletree 19. This method of construction permits the hitching of two wheel horses to the swingletrees 9 and two horses to the swingletrees 19.

In the operation of drawing the vehicle or implement to which this equalizer is secured, should a rut or stone be encountered which would suddenly check or stop the travel of the machine or implement, the shock incident to the interruption is compensated in that the arms 13 will curve toward one another within certain limits to absorb and compensate the shock.

This four horse equalizer is simple and inexpensive in construction and both durable and efficient in operation. When but two horses are to be employed, the cross bar 4 is removed and the doubletree 18 secured to the king pin.

Having thus described my said invention, what I claim as new and desire to secure by United States Letters Patent is:

The combination with a wagon tongue, of a cross bar pivotally secured thereto, a stub tree secured to each end of said cross bar, a swingletree secured to the outer end of each stub tree, a chain section extending from the inner end of each stub tree, a shackle comprising a centrally positioned draw ear from which extend two oppositely directed arms, each ending in a terminal eye curved in a direction opposite to said ear and carrying the forward end of one of said chain sections, a drag chain secured to said ear, a doubletree secured to the forward end of said drag chain, and two swingletrees carried by said doubletree.

In testimony whereof I affix my signature, in presence of two witnesses.

WILLIAM MITCHELL.

Witnesses:
H. KRAUTKREMER,
A. P. ARNESON.